US009621253B2

(12) United States Patent
Keerthi

(10) Patent No.: US 9,621,253 B2
(45) Date of Patent: Apr. 11, 2017

(54) SINGLE SLOT BI-DIRECTIONAL MESSAGE EXCHANGE IN RELAY NETWORKS

(71) Applicant: Empire Technology Development LLC, Wilmington, DE (US)

(72) Inventor: Arvind Vijay Keerthi, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 120 days.

(21) Appl. No.: 14/706,926

(22) Filed: May 7, 2015

(65) Prior Publication Data

US 2015/0326355 A1    Nov. 12, 2015

(30) Foreign Application Priority Data

May 9, 2014   (IN) ............................ 2324/CHE/2014

(51) Int. Cl.
| | | |
|---|---|---|
| H04J 1/08 | (2006.01) | |
| H04B 7/155 | (2006.01) | |
| H04L 5/00 | (2006.01) | |
| H04L 5/14 | (2006.01) | |
| H04W 56/00 | (2009.01) | |

(Continued)

(52) U.S. Cl.
CPC ........... *H04B 7/155* (2013.01); *H04B 1/3827* (2013.01); *H04L 5/0005* (2013.01); *H04L 5/14* (2013.01); *H04W 56/001* (2013.01); *H04W 72/0446* (2013.01); *H04W 72/0453* (2013.01); *H04W 88/023* (2013.01)

(58) Field of Classification Search
CPC ... H04B 7/155; H04B 1/3827; H04W 56/001; H04W 72/0453; H04W 72/0446; H04W 88/023; H04L 5/14; H04L 5/0005
See application file for complete search history.

(56) References Cited

U.S. PATENT DOCUMENTS

| | | | |
|---|---|---|---|
| 6,275,990 B1 * | 8/2001 | Dapper | ................... G06F 17/14 348/E7.07 |
| 6,282,683 B1 * | 8/2001 | Dapper | ................... G06F 17/14 348/E7.07 |

(Continued)

FOREIGN PATENT DOCUMENTS

EP         2264929 B1      3/2013

OTHER PUBLICATIONS

Bliss, D W. et al., "Simultaneous Transmission and Reception for improved Wireless Network Performance," IEEE/SP 14th Workshop on Statistical Signal Processing, pp. 478-482, (Aug. 26-29, 2007).

(Continued)

*Primary Examiner* — Jay P Patel
(74) *Attorney, Agent, or Firm* — Turk IP Law, LLC

(57) ABSTRACT

Technologies are generally provided for single-slot bi-directional message exchange that allows two nodes to transmit in the same time-slot at the same frequency. The transmissions may be relayed to the destination node within the same time-slot. An interfering signal generated by each node may appear time-offset in the same time slot as it was transmitted, superimposed on the message signal from the other terminal. Roundtrip and cross-trip delay estimates and channel estimates may be determined at each node. Transmitted signals may be recovered at the destination nodes based on the roundtrip and cross-trip delay estimates and channel estimates.

25 Claims, 9 Drawing Sheets

(51) Int. Cl.
*H04B 1/3827* (2015.01)
*H04W 72/04* (2009.01)
*H04W 88/02* (2009.01)

(56) References Cited

U.S. PATENT DOCUMENTS

| | | | | |
|---|---|---|---|---|
| 6,952,454 | B1* | 10/2005 | Jalali | H04L 5/023 370/208 |
| 7,280,564 | B1* | 10/2007 | Geile | H04L 27/2652 370/507 |
| 2007/0147229 | A1* | 6/2007 | Geile | G06F 17/14 370/208 |
| 2012/0076183 | A1* | 3/2012 | Dapper | H03M 13/356 375/219 |
| 2013/0114468 | A1 | 5/2013 | Hui et al. | |

OTHER PUBLICATIONS

Choi, J II. et al., "Achieving Single Channel, Full Duplex Wireless Communication," Proceedings 16th International Conference on Mobile Computing and Networking, pp. 1-12 (2010).

Duarte, M. and Sabharwal, A., "Full-duplex wireless communication using off-the-self radios: Feasibility and first results," 2010 Conference Record of the Forty Fourth Asilomar Conference on Signals, Systems and Computers (ASILOMAR), pp. 1558-1562 (Nov. 7-10, 2010).

Gomadam, K.S. and Jafar, S.A., "Optimal Relay Functionality for SNR Maximization in Memoryless Relay Networks," IEEE Journal on Selected Areas in Communications, vol. 25, Issue 2, pp. 390-401 (Feb. 2007).

Jain, M., et al., "Practical, Real-Time, Full Duplex Wireless," Proceedings of the 17th annual international conference on Mobile computing and networking, pp. 301-12 (Sep. 19-23, 2011).

Katti, S. et al.,"Embracing Wireless Interference: Analog Network Coding," ACM SIGCOMM Computer Communication Review, vol. 37, Issue 4, pp. 397-408 (Oct. 2007).

Knox, M.E., "Single Antenna Full Duplex Communication using a Common Carrier," 2012 IEEE 13th Annual Wireless and Microwave Technology Conference (WAMICON), pp. 1-6, (Apr. 15-17, 2012).

Radunovic, B. et al., "Rethinking Indoor Wireless Mesh Design: Low Power, Low Frequency, Full Duplex," 2010 Fifth IEEE Workshop on Wireless Mesh Networks (WIMESH 2010), pp. 1-6 (Jun. 21, 2010).

\* cited by examiner

SINGLE SLOT BI-DIRECTIONAL MESSAGE EXCHANGE IN RELAY NETWORKS

CROSS-REFERENCE TO RELATED APPLICATION

This Application claims priority under 35 U.S.C. §119(a) of India Application No. 2324/CHE/2014 filed on May 9, 2014. The disclosure of the India Application is herein incorporated by reference in its entirety.

BACKGROUND

Unless otherwise indicated herein, the materials described in this section are not prior art to the claims in this application and are not admitted to be prior art by inclusion in this section.

In a wireless network, when two nodes try to communicate with each other, but cannot do so directly (for example, because they are not in each other's range), the nodes may use a relay node to relay their messages to one another. In some communication networks, the exchange of messages may take four time slots: first node to relay node, relay node to second node, and similar return path.

Communication networks could benefit from improvements and/or alternative or additional solutions in order to effectively provide faster message exchanges.

SUMMARY

The present disclosure generally describes methods, apparatus, systems, devices, and/or computer program products to provide single-slot bi-directional message exchange in relay networks.

According to some examples, methods to provide single-slot bi-directional message exchange between a first transceiver and a second transceiver are described. An example method may include transmitting, by the first transceiver, a first signal in a first time slot, wherein first signal is transmitted at a carrier frequency; receiving, by the first transceiver while transmitting in the first time slot, a relay signal, where the relay signal is received at the carrier frequency and where the relay signal is a combination of the first signal and a second signal; and determining, by the first transceiver, a transformed first signal based on the first signal, a roundtrip delay estimate, and a roundtrip channel estimate. The example method may also include subtracting, by the first transceiver, the transformed first signal from the relay signal to recover a transformed second signal; and recovering, by the first transceiver, the second signal based on the transformed second signal, a cross-trip delay estimate and a cross-trip channel estimate.

According to other examples, a transceiver device for single slot signal exchange may be described. An example transceiver device may include a full-duplex single carrier (FDSC) module configured to transmit a first signal and to receive a relay signal in a first time slot, the first signal and the relay signal being transported on a common carrier frequency across an intervening communication channel, where the relay signal is a combination of the first signal and a second signal; a timing adjustment module coupled to the FDSC module, the timing adjustment module configured to determine a roundtrip delay estimate and a cross-trip delay estimate; and a channel estimator module coupled to the FDSC module, the channel estimator module configured to determine a roundtrip channel estimate and a cross-trip channel estimate. The example transceiver device may further include a signal recovery module coupled to the FDSC module, the signal recovery module configured to recover the second signal based on the first signal, the relay signal, the roundtrip delay estimate, the roundtrip channel estimate, the cross-trip delay estimate and the cross-trip channel estimate.

According to further examples, a method for message exchange in a single time slot in a relay network may be described. An example method may include transmitting, by a first node of the relay network, a first signal; transmitting, by a second node of the relay network, a second signal; receiving, by a relay node of the relay network, the first signal and the second signal; transmitting, by the relay node, a relay signal, wherein the relay signal is based on the first signal and the second signal; and receiving, by the first node and the second node, the relay signal. The example method may further include subtracting, by the first node, a transformed first signal from the relay signal to recover the second signal; and subtracting, by the second node, a transformed second signal from the relay signal to recover the first signal, where the first node, the second node, and the relay node concurrently transmit and receive in the single time slot, and where the first signal, the second signal, and the relay signal are transmitted at a carrier frequency.

According to yet other examples, a communication system configured to support single-slot bi-directional message exchange may be described. An example communication system may include a first node and a second node communicatively coupled to the first node via a relay node, where the first node and the second node may be configured to transmit respective messages simultaneously in a first time slot and decode the other node's transmitted message based on the each node's ability to distinguish its own transmitted message. The communication system may also include the relay node configured to forward the transmitted messages within the first time slot such that the first node receives a superimposition of its own transmitted message and the second node's transmitted message, and the second node receives a superimposition of its own transmitted message and the first node's transmitted message.

According to yet further examples, a wireless communication device configured to facilitate single-slot bi-directional message exchange may be described. An example wireless communication device may include a processor and a communication module configured to exchange messages with another wireless communication device via a relay node that employs full-duplex, single channel (FDSC) communication. The processor may be configured to perform or control performance of transmit, by the communication module, a first message in a first time slot, where a second message is transmitted from the other wireless communication device in the first time slot; receive, by the communication module, a superimposition of the first message and the second message; and decode the second message, at the first time slot, based on an ability to separate the first message from the received superimposition of the first message and the second message.

According to some examples, a non-transitory computer-readable medium may be described that includes computer-readable instructions stored thereon that are executable by one or more processors to perform or cause to be performed the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
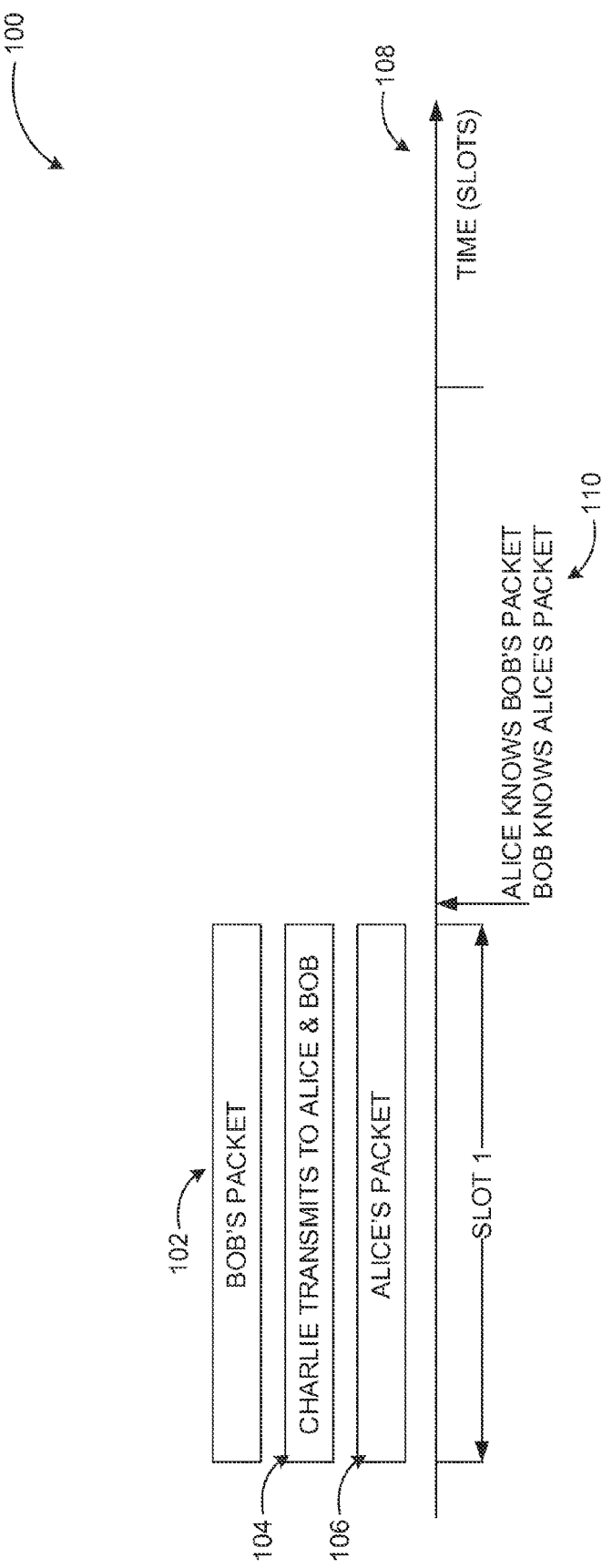
FIG. 1 illustrates an example single-slot message exchange in a relay network.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, and/or computer program products to provide single-slot bi-directional message exchange in relay networks.

Briefly stated, technologies are generally provided for single-slot bi-directional message exchange that enables two nodes to transmit in the same time-slot at the same frequency. The transmissions may be relayed to the destination node within the same time-slot. An interfering signal generated by each node may appear time-offset in the same time slot as it was transmitted, superimposed on the message signal from the other terminal Roundtrip and cross-trip delay estimates and channel estimates may be determined at each node. Transmitted signals may be recovered at the destination nodes based on the roundtrip and cross-trip delay estimates and channel estimates.

FIG. 1 illustrates an example single-slot message exchange in a relay network, arranged in accordance with at least some embodiments described herein.

Diagram 100 shows exchange of messages between three nodes in a communication network. For illustration purposes, the nodes are designated as Bob, Charlie, and Alice exchanging packets (single packet message exchange). To provide single-slot message exchange between two end-nodes of a relay network, utilizing full-duplex, single channel (FDSC) communication, Alice may transmit her packet 106, and at the same time Bob may transmit his packet 102. Charlie the router may hear them both, and at the same time transmit the sum of Alice's and Bob's packets 104. All three may transmit at the same time and at the same carrier frequency. The packet (or signal) transmissions are shown on timeline 108. As a result of the transmissions within the same time slot, Alice may know Bob's packet and Bob may know Alice's packet (110) at the end of the time slot.

Even as Bob transmits his signal, he may receive from Charlie the sum of his and Alice's signal. He may recover Alice's signal by subtracting his own signal from the combination signal he received from Charlie thereby completing Alice-to-Bob communication. Alice may perform the same operation at her end thereby completing the Bob-to-Alice communication, in the span of the same time slot. Alice, Bob, and Charlie may have FDSC capability, in order to transmit and receive at the same time. Microwave circulators with high inter-port isolation, self-interference cancelling circuits, strategic placement of antennas so that transmit and receive signals fall in each other's nulls are some examples of FDSC systems that may be employed in a communication system according to embodiments.

Thus, two communicating nodes in a communication network according to embodiments may transmit in the same time-slot concurrently, which may be amplified and forwarded by a relay node immediately (within the same time-slot). As a result, an interfering signal generated by each node may appear time-offset in the same time slot as it was transmitted, superimposed on the message signal from the other node. Strict synchronization may not be needed, as the time offset may aid in decoding.

Any nodes of a wireless communication network may communicate using the single-slot, bi-directional message exchange described herein. The nodes may include, but are not limited to, a cellular phone, a smart phone, a computing device equipped with wireless communication capability, a specialized device equipped with wireless communication capability, a base station, or other type of wireless communication device.

Figure 2:
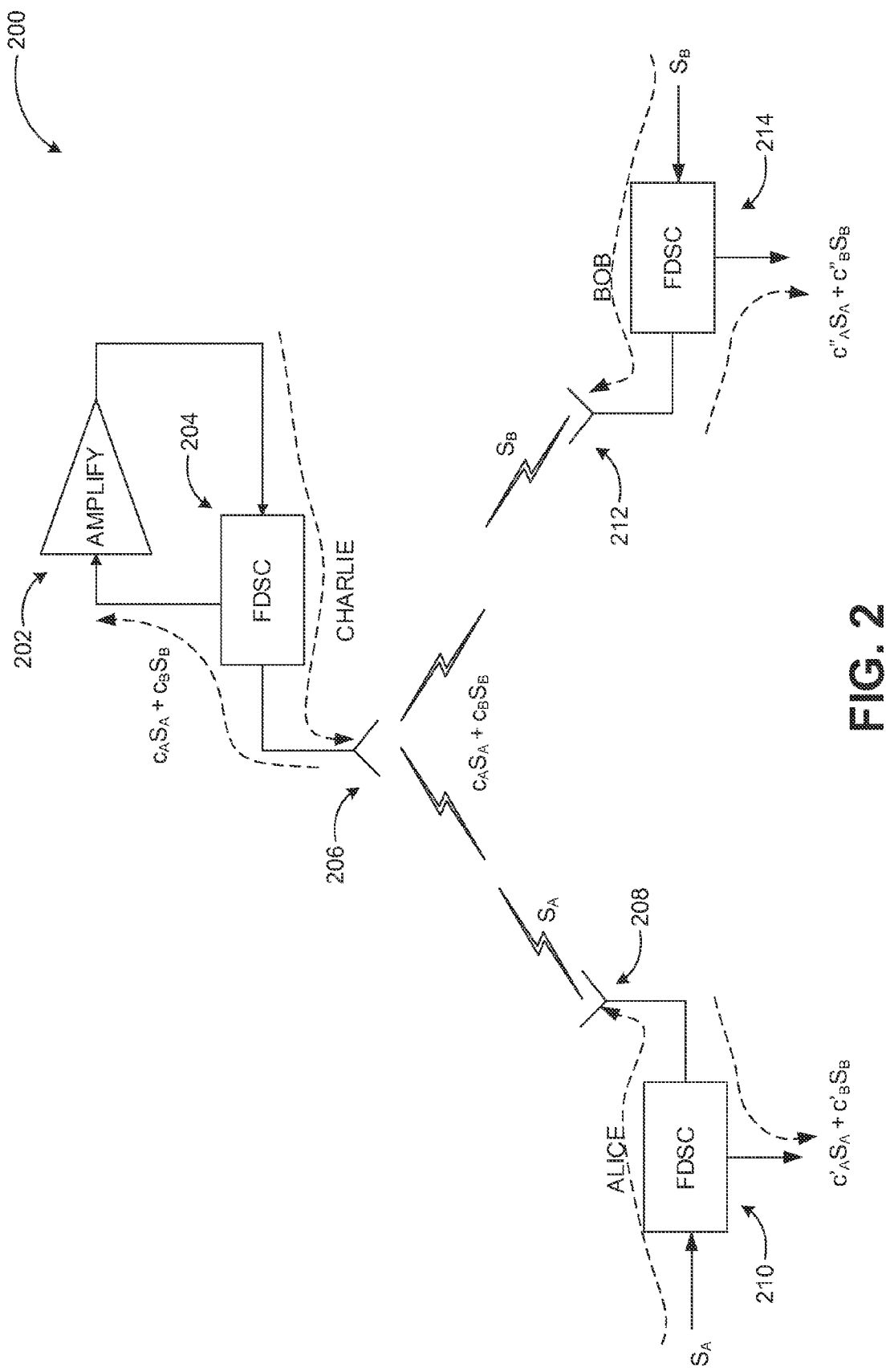
FIG. 2 illustrates example signal processing at source, destination, and relay nodes of a single-slot message exchange.

FIG. 2 illustrates example signal processing at source, destination, and relay nodes of a single-slot message exchange, arranged in accordance with at least some embodiments described herein.

Diagram 200 shows exchange of signals between nodes Alice and Bob via relay node Charlie, where the nodes are represented as FDSC modules 210, 214, and 204 with respective antennas 208, 212, and 206. The relay node, Charlie, may also include an amplifier 202.

In an example scenario, Alice may transmit her signal, $S_A$, and after traversing the antenna 208 and an intervening channel, $S_A$ may arrive as $c_A S_A$ at the relay node, Charlie.

The multiplicative factor, $c_A$, may represent an effect of the channel. In a like manner, signal $S_B$ may arrive as $c_B S_B$ at Charlie from Bob via an intervening channel. The multiplicative factor, $c_B$, may represent an effect of the channel. $c_A S_A$ and $c_B S_B$ may superpose at Charlie's antenna 206, and the resulting (combination) signal $c_A S_A + c_B S_B$ may appear at Charlie's receive port. This combination signal may be amplified by amplifier 202 of Charlie, and re-transmitted instantaneously by routing through Charlie's transmit port. Thus, Charlie may act as a repeater.

At Alice's receive port, the combination signal transmitted by Charlie may appear with some modification/transformation by the channel. This transformed signal may be represented as $c'_A S_A + c'_B S_B$. As Alice has at her end her own transmitted signal $S_A$ and the transformed signal $c'_A S_A + c'_B S_B$, she may recover Bob's signal by subtracting her own transmitted signal from the transformed signal taking into account the modification c' by the channel.

Similarly, at Bob's receive port, the combination signal transmitted by Charlie may appear with some modification/transformation by the channel. This transformed signal may be represented as $c''_A S_A + c''_B S_B$. As Bob has at his end his own transmitted signal $S_B$ and the transformed signal $c''_A S_A + c''_B S_B$, he may recover Alice's signal by subtracting his own transmitted signal from the transformed signal taking into account the modification c'' by the channel.

Figure 3:
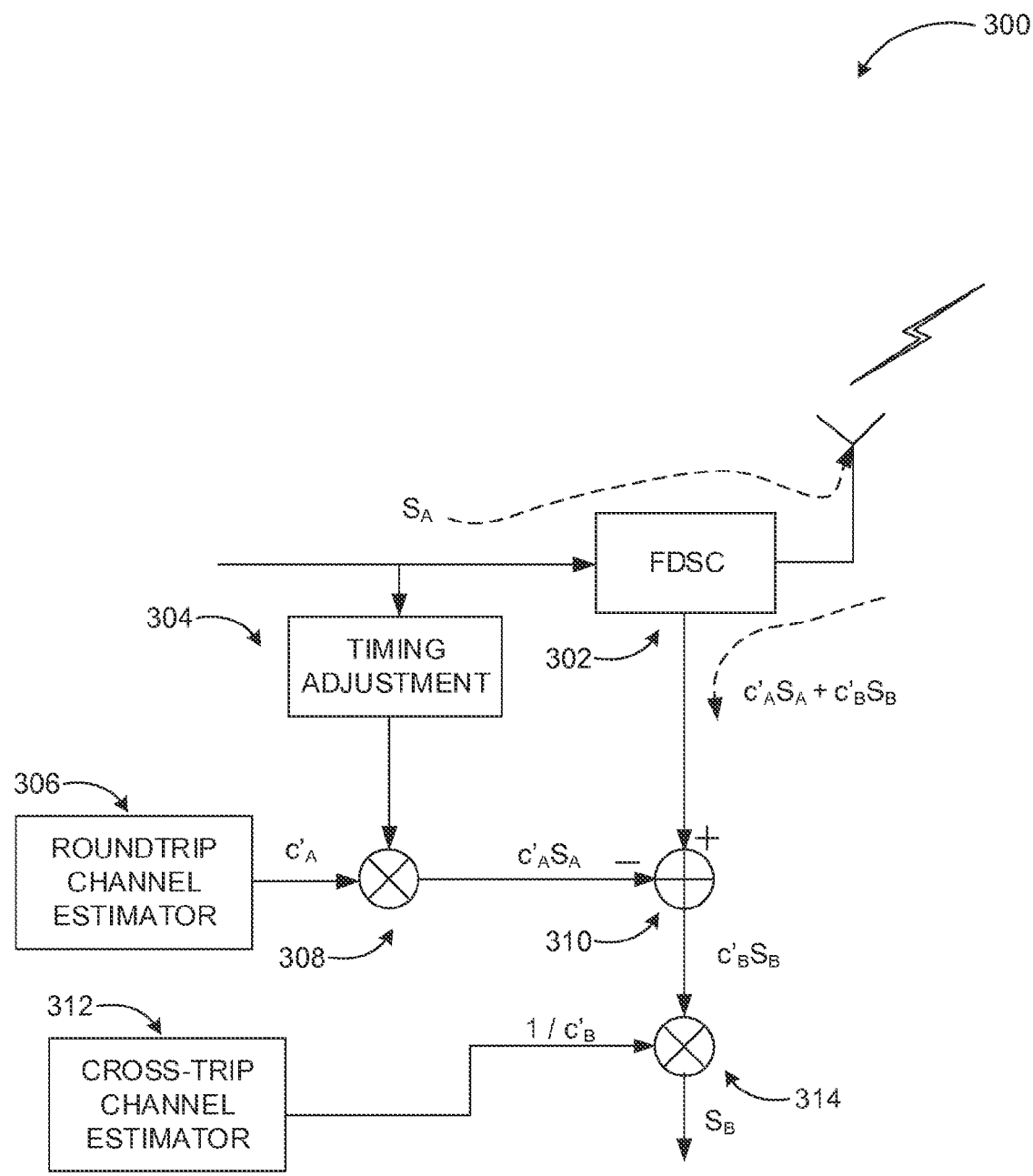
FIG. 3 illustrates an example recovery of received signal at an example destination node through subtraction of the destination node's own transmitted signal from the received sum signal.

FIG. 3 illustrates an example recovery of received signal at an example destination node through subtraction of the destination node's own transmitted signal from the received sum signal, arranged in accordance with at least some embodiments described herein.

While the recovery of the signal received from the source node may be accomplished through a variety of circuits and configurations, diagram 300 provides an example circuit configuration for illustration purposes. The example circuit may be on Alice's side, where Alice's own transmitted signal $S_A$ may be sent through a FDSC module 302 and an antenna coupled thereto (which may be respectively implemented by FDSC module 210 and antenna 208 shown in FIG. 2) to Bob via Charlie. Alice may receive the transformed signal $c'_A S_A + c'_B S_B$, which may be a combination of Alice's own transmitted signal and Bob's signal both subject to channel modifications. Alice may determine an estimation of the multiplicative effect of the roundtrip channel at a roundtrip channel estimator module 306 ($c'_A$). Concurrently, Alice's own signal $S_A$ may be processed by a timing adjustment module 304 to compensate for propagation delay that occurs while the signal is returned from Charlie. The propagation delay compensated signal may be multiplied with $c'_A$ (308) and subtracted from the transformed signal (310) yielding $c'_B S_B$.

Alice may also determine a cross-trip channel estimate $c'_B$ at the cross-trip channel estimator module 312 and multiply (314) $c'_B S_B$ with an inverse of c'B to obtain Bob's signal $S_B$ as it was sent. The various elements of the destination node shown in FIG. 3 (as well as in FIGS. 4A-4B below) may be operatively coupled to each other and may be embodied in hardware, software or other computer-readable instruction stored on a non-transitory computer-readable medium and executable by a processor, or combination thereof. Bob may perform substantially similar operations on his end (node/device) while Alice is recovering Bob's signal allowing the exchange to take place substantially within the same time slot. Further example techniques of how the propagation delays and channel estimates may be determined as discussed below.

Figure 4A:
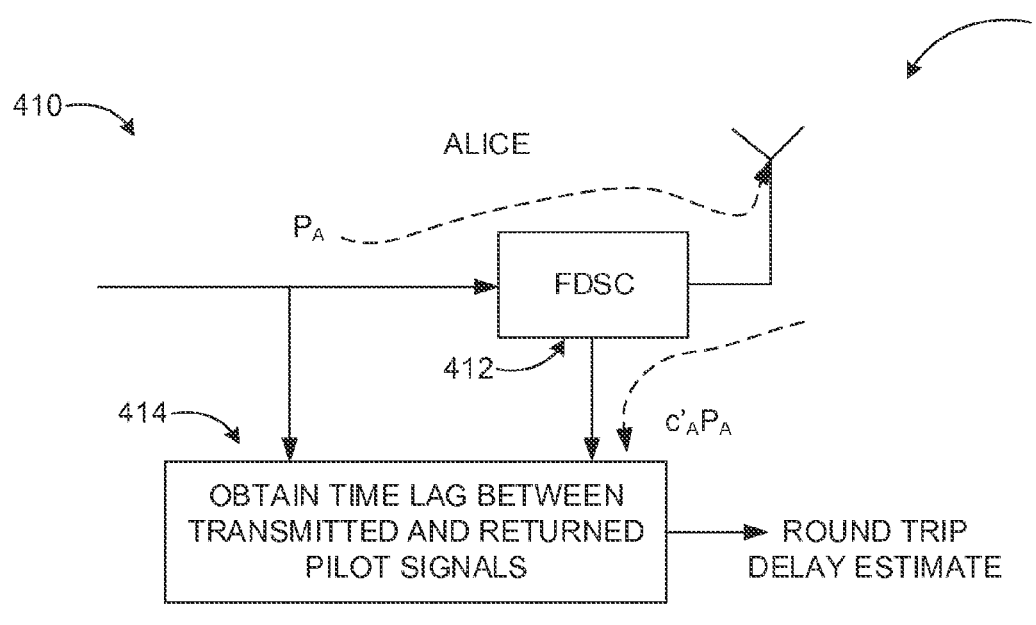
FIGS. 4A and 4B illustrate example propagation delay estimation and channel estimation at one of the nodes exchanging messages.
Figure 4A:
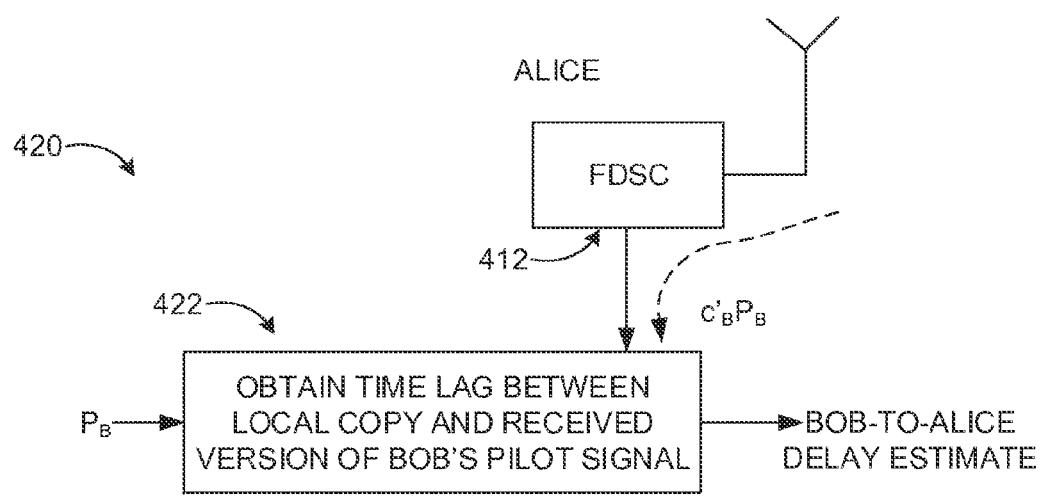
Figure 4B:
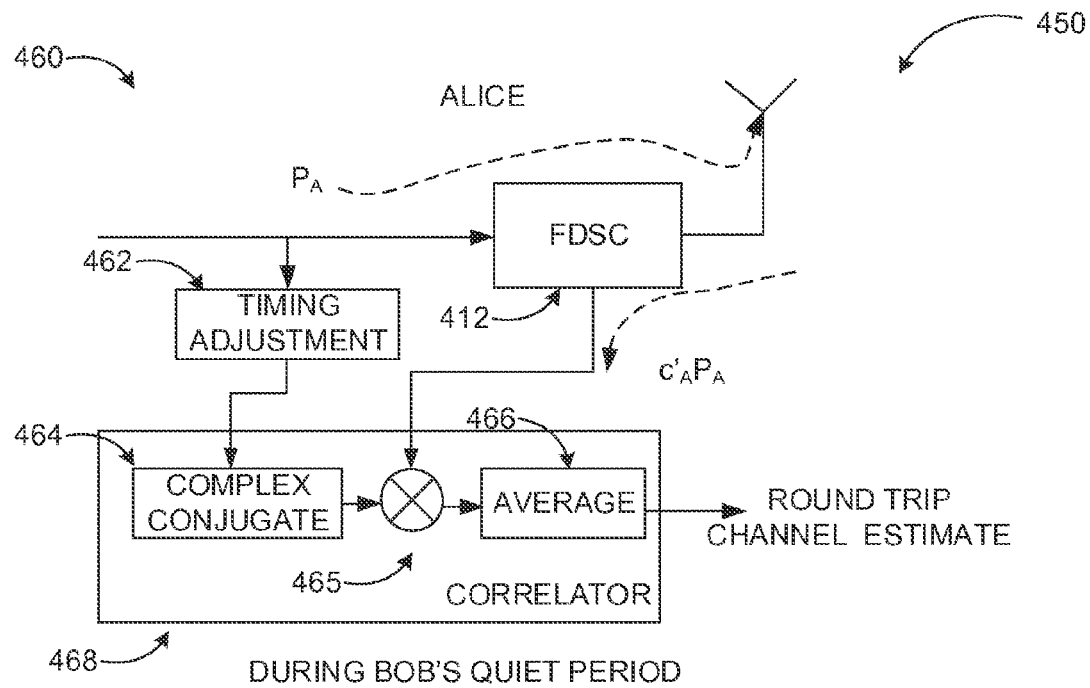
Figure 4B:
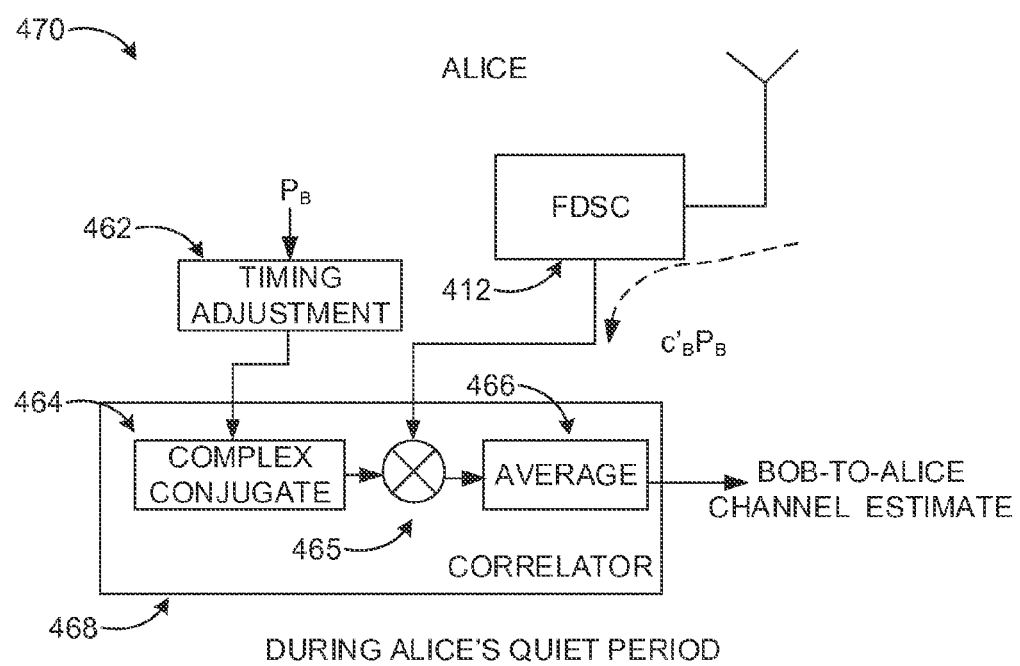

FIGS. 4A and 4B illustrate example propagation delay estimation and channel estimation at one of the nodes exchanging messages, arranged in accordance with at least some embodiments described herein.

As discussed above, propagation delay and channel effects on the exchanged signals may be two parameters that can be determined in order to facilitate the recovery of the received signals at both end nodes. Diagram 400 of FIG. 4A shows examples of how roundtrip propagation delay and cross-trip propagation delay may be estimated using a pilot signal.

In an example scenario 410, Alice may transmit a pilot signal $P_A$ during a period when Bob is in a quiet state (not transmitting). The pilot signal transmission and quiet state may be coordinated between the two end nodes through an agreed protocol that specifies timings or exchange of a trigger signal.

Alice's pilot signal $P_A$, transmitted from her FDSC module 412 (which may be implemented by FDSC module 210 and/or 302) may be returned instantaneously by the relay node, Charlie, as $c'_A P_A$, with $c'_A$ representing the channel's modification on the returned pilot signal. Comparing the transmitted and returned pilot signals, Alice may obtain a time lag between those two (414). The time lag may then be used as roundtrip delay estimate to recover Bob's signal from the combination signal received at Alice's FDSC module 412.

In an example scenario 420, Alice may transition to a quiet state (not transmitting) and Bob may transmit a pilot signal $P_B$. Bob's pilot signal may arrive at Alice as $c'_B P_B$, $C'_B$ representing channel modification on the received pilot signal. Being a pilot signal, $P_B$ may be known a priori to both Alice and Bob; a local copy of $P_B$ may be stored in the memory of node Alice at the time of manufacture, for example. Comparing the received pilot signal to a local copy, Alice may obtain an estimate of the delay between Bob and herself (422). This Bob-to-Alice delay estimate may then be used to recover Bob's signal from the combination signal received at Alice's FDSC module 412.

Diagram 450 of FIG. 4B shows example configurations of how roundtrip and cross-trip channel estimates may be obtained. In configuration 460, Alice may transmit her pilot signal $P_A$ through her FDSC module 412 and perform propagation delay compensation at her timing adjustment module 462 (which may be implemented by the timing adjustment module 304 of FIG. 3) while Bob is in the quiet state. Alice may then use a correlator 468 to obtain roundtrip channel estimate for her pilot signal returned from Charlie. Correlator 468 may use a timing adjusted complex conjugate 464 of the pilot signal, multiply (465) the complex conjugate with the returned signal $c'_A P_A$, and take an average 466 of the product yielding the roundtrip channel estimate for Alice.

In configuration 470, Alice may enter the quiet state and Bob may transmit his pilot signal $P_B$, which may arrive as $c'_B P_B$ at Alice's FDSC module 412. Using a local copy of Bob's pilot signal $P_B$, Alice may perform (using the various components described above with respect to FIG. 4A) timing adjustment on the received pilot signal and correlate the received signal with the local copy obtaining Bob-to-Alice channel estimate, which may then be used to recover Bob's signal from the received combination signal at Alice during actual message exchange.

An example protocol for determining propagation delays and channel estimates may begin with Bob entering a quiet state and Alice transmitting her pilot signal. Using the returned pilot signal, Alice may determine her roundtrip propagation delay and her roundtrip channel estimate. Concurrently, Bob may determine Alice-to-Bob propagation delay and Alice-to-Bob channel estimate using Alice's pilot signal. Next, Alice may enter a quiet state and Bob may transmit his pilot signal. Using the returned pilot signal, Bob may determine his roundtrip propagation delay and his roundtrip channel estimate. Concurrently, Alice may determine Bob-to-Alice propagation delay and Bob-to-Alice channel estimate using Bob's pilot signal.

The propagation delay and channel estimate determination may be performed prior to each message exchange, once before a specific number of message exchanges, or based on other criteria. For example, if Alice and Bob represent mobile wireless communication devices and channel characteristics may vary, the determination process may be repeated before each message exchange. On the other hand, if the devices are stationary and channel characteristics are not expected to vary substantially, the determination process may be repeated less frequently.

Figure 5:
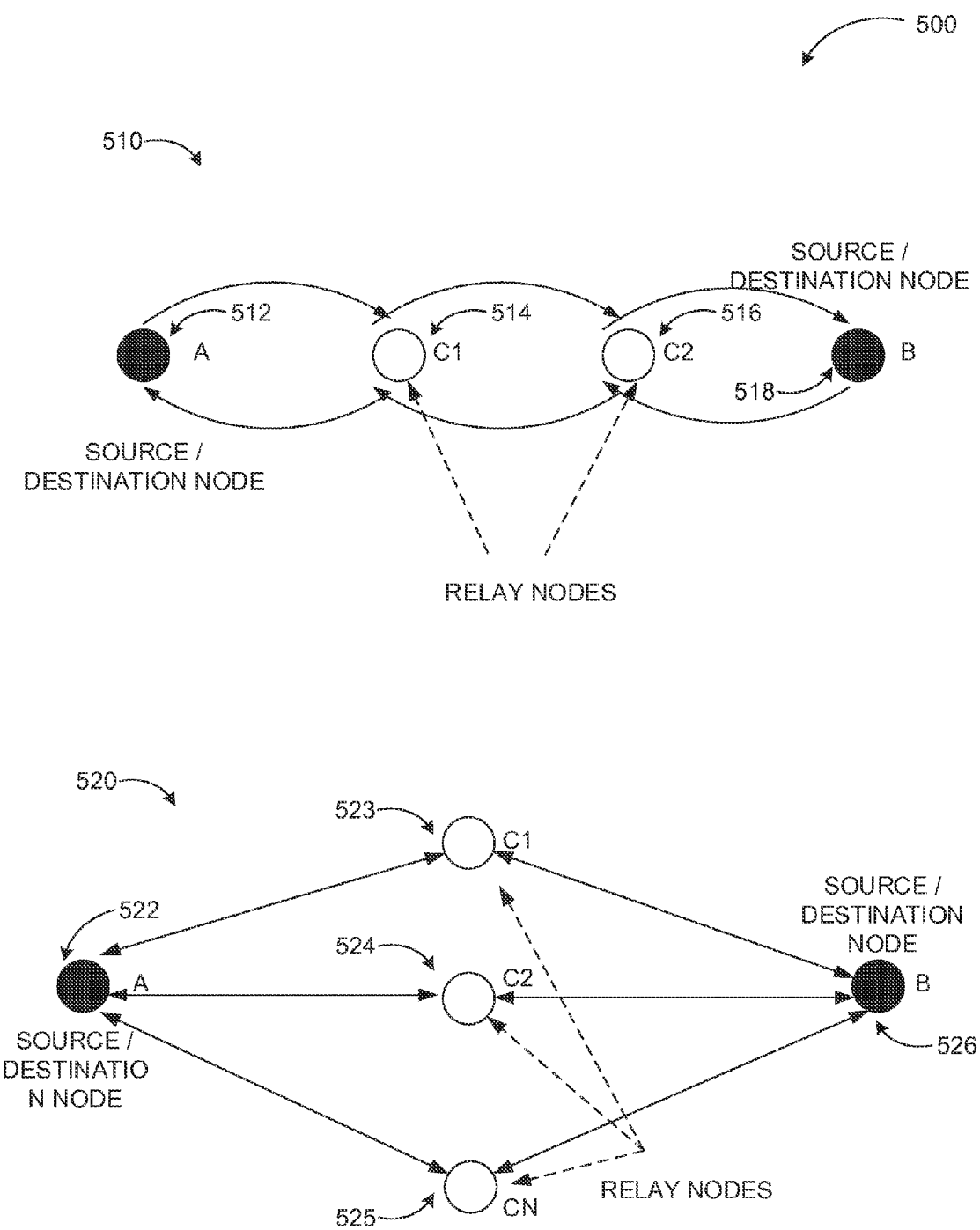
FIG. 5 illustrates two example architectures of multiple relay nodes, one with the relay nodes in series and another with the relay nodes in parallel.

FIG. 5 illustrates two example architectures of multiple relay nodes, one with the relay nodes in series and another with the relay nodes in parallel, arranged in accordance with at least some embodiments described herein.

Diagram 500 shows an example series relay network structure 510, where communication (exchange of messages) between a source (or destination) node A 512 and a destination (or source) node B 518 may be facilitated through two example relay nodes C1 AND C2 (514 and 516, respectively). The source and destination nodes may switch roles as messages are exchanged. For example, a message may be transmitted from source node A 512 to relay node C1 514, which may in turn transmit the message to relay node C2 516, which may in turn transmit the message to destination node B 518. Similar relay-based transmission of a message may occur in the opposite direction.

Diagram 500 also shows an example parallel relay network structure 520, where relay nodes C1, C2, CN (523, 524, and 525, respectively) relaying messages between a source (or destination) node A 522 and a destination (or source) node B 526 may be in parallel to each other.

In the example series relay network structure 510 and the example parallel relay network structure 520 described above, the relay nodes may near-instantaneously re-transmit any messages they receive. In other examples, the relay nodes within a communication network may be configured in other ways, for example combinations of series and parallel nodes.

While the relay nodes according to some examples may amplify-and-forward received signals, other types of signal processing may also be performed at the relay nodes prior to forwarding. For example, the received signals may be de-noised by de-spreading (for CDMA signals) or demodulated prior to forwarding (the "DF" relay). In yet other examples, the relay nodes may perform an estimate of the transmitted symbols prior to forwarding (the "EF" relay).

The communication networks that include the source and destination nodes, as well as the relay nodes, may include an Evolved Universal Mobile Telecommunications System Terrestrial Radio Access Network (eUTRAN), a long term evolution (LTE) network, an LTE-Advanced network, a high speed packet access (HSPA) network, an advanced HSPA network, or other wireless network or combination thereof.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein.

Figure 6:
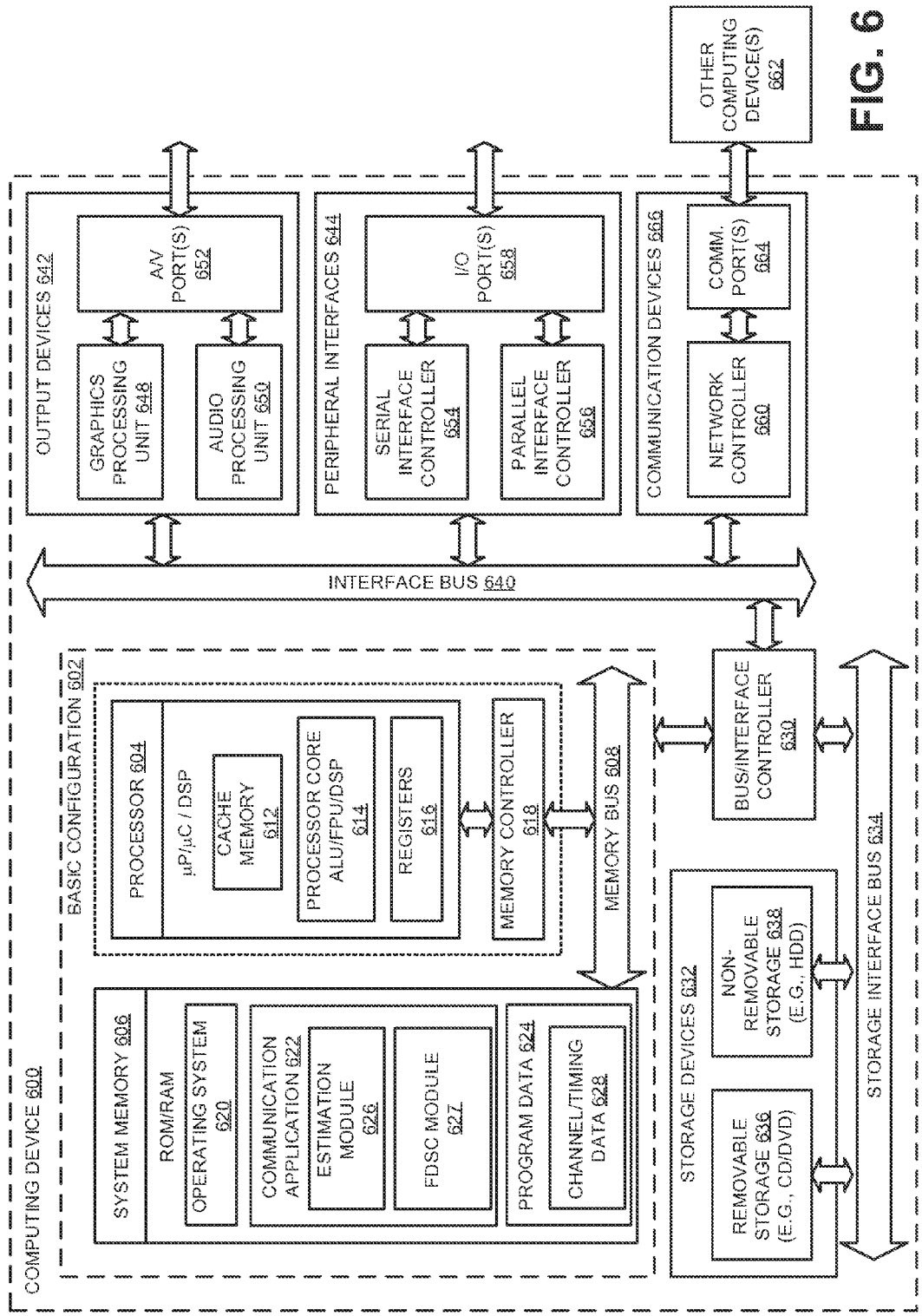
FIG. 6 illustrates a general purpose computing device, which may be used to implement single-slot bi-directional message exchange in relay networks as described herein.

FIG. 6 illustrates a general purpose computing device, which may be used to implement single-slot bi-directional message exchange in relay networks as described herein, arranged in accordance with at least some embodiments described herein. The computing device 600 may be implanted, for example, as any one or more of the source, destination, or relay nodes described above.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a cache memory 612, a processor core 614, and registers 616. An example of the processor core 614 may include an arithmetic logic unit (ALU), a floating point unit (FPU), a digital signal processing core (DSP Core), or any combination thereof. An example memory controller 618 may also be used with processor 604, or in some implementations memory controller 614 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more communication applications 622, and program data 624. Communication application 622 may include an estimation module 626 and an FDSC module 627, which may be used to implement the corresponding modules previously described above with reference to one or more of FIGS. 1-5. Single-slot, bi-directional message exchange according to embodiments may be provided by transmitting a first signal at a carrier frequency in a first time slot and receiving a relay signal at the carrier frequency while transmitting in the first time slot, where the relay signal is a combination of the first signal and a second signal. A transformed first signal may then be determined based on the first signal, a roundtrip delay estimate, and a roundtrip channel estimate. The transformed first signal may be subtracted from the relay signal to recover a transformed second signal and the second signal may be recovered based on the transformed second signal, a cross-trip delay estimate, and a cross-trip channel estimate. The first signal may be transmitted and the relay signal received making use of FDSC communication. The communications (transmission and reception) may be performed by the FDSC module 627, while the estimation module 626 may perform actions associated with determining roundtrip and cross-trip delay estimates and channel estimates. Program data 624 may include one or more of channel and/or timing data 628 and similar data as discussed above in conjunction with at least FIG. 1 through 5. This data may be useful for providing single-slot, bi-directional message exchange as is described herein. The basic configuration 602 is illustrated in FIG. 6 by those components within the inner dashed line. Computing device 600 may be implemented as a node in a communication network or as part of a base station in such a network.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630). An example of the output devices 642 may include a graphics processing unit 648 and an audio processing unit 650, which may be configured to communicate to various external devices such as a display or speakers via one or more A/V ports 652. An example of the peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example of the communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such as (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
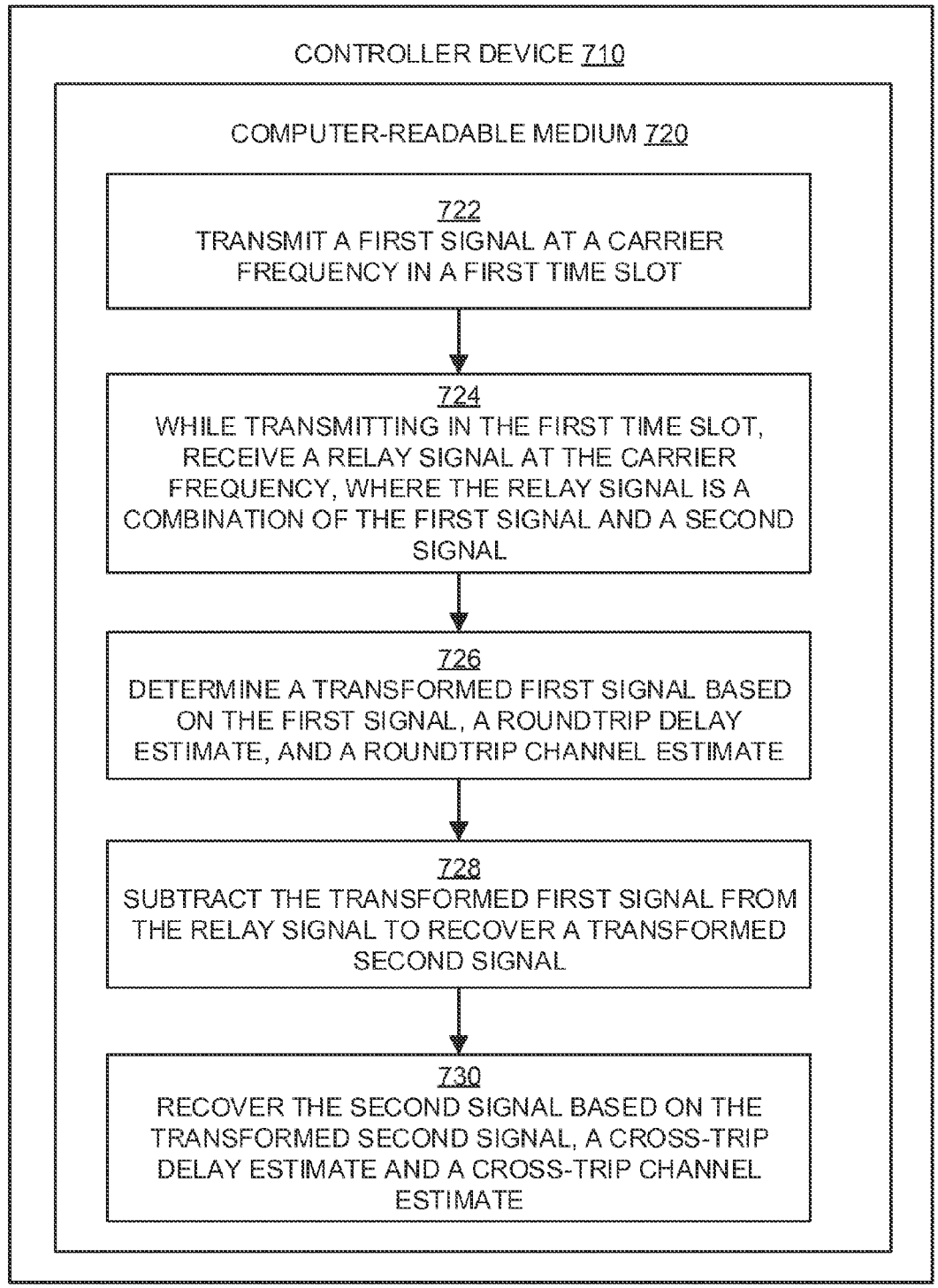
FIG. 7 is a flow diagram illustrating an example method to provide single-slot bi-directional message exchange in relay networks that may be performed by a computing device such as the computing device in FIG. 6.

FIG. 7 is a flow diagram illustrating an example method to provide single-slot bi-directional message exchange in relay networks that may be performed by a computing device such as the computing device in FIG. 6, arranged in accordance with at least some embodiments described herein.

Example methods may include one or more operations, functions or actions as illustrated by one or more of blocks 722 through 730, and may in some embodiments be performed by a computing device such as the computing device 600 in FIG. 6. The operations described in the blocks 722-730 may also be implemented through execution of computer-executable instructions stored in a non-transitory computer-readable medium, such as a computer-readable medium 720 of a controller device 710, and executable by one or more processors. In other embodiments, the various operations may be implemented/provided using methods alternatively or in addition to the execution of computer-executable instructions.

An example method for providing single-slot, bi-directional message exchange in a communication network may begin with block 722, "TRANSMIT A FIRST SIGNAL AT A CARRIER FREQUENCY IN A FIRST TIME SLOT," where a first transceiver acting as a source node in the communication network according to embodiments may transmit a signal using FDSC.

Block 722 may be followed by block 724, "WHILE TRANSMITTING IN THE FIRST TIME SLOT, RECEIVE A RELAY SIGNAL AT THE CARRIER FREQUENCY, WHERE THE RELAY SIGNAL IS A COMBINATION OF THE FIRST SIGNAL AND A SECOND SIGNAL," where the first transceiver may receive a relay signal from a relay node in the communication network at the same carrier frequency in the same time slot. The relay signal may be a superimposition of the transmitted first signal and a second signal from a second transceiver acting as a destination node in the communication network.

Block 724 may be followed by block 726, "DETERMINE A TRANSFORMED FIRST SIGNAL BASED ON THE FIRST SIGNAL, A ROUNDTRIP DELAY ESTIMATE, AND A ROUNDTRIP CHANNEL ESTIMATE," where the first transceiver may use the first signal, a roundtrip delay estimate, and a roundtrip channel estimate to determine a transformed first signal. According to some examples, the roundtrip delay estimate and the roundtrip channel estimate may be determined using a pilot signal transmitted by (and returned to) the first transceiver while the second transceiver is in a quiet state prior to the signal exchange.

Block 726 may be followed by block 728, "SUBTRACT THE TRANSFORMED FIRST SIGNAL FROM THE RELAY SIGNAL TO RECOVER A TRANSFORMED SECOND SIGNAL," where the first transceiver may recover a transformed second signal by subtracting the transformed first signal from the received relay signal.

Block 728 may be followed by block 730, "RECOVER THE SECOND SIGNAL BASED ON THE TRANSFORMED SECOND SIGNAL, A CROSS-TRIP DELAY ESTIMATE AND A CROSS-TRIP CHANNEL ESTIMATE," where the first transceiver may recover the second signal (in the same time slot as the transmission and reception) using the transformed second signal, a cross-trip delay estimate, and a cross-trip channel estimate. According to some examples, the cross-trip delay estimate and the cross-trip channel estimate may be determined using another pilot signal received from the second transceiver while the first transceiver is in a quiet state prior to the exchange of signals.

The operations included in the process of FIG. 7 described above are for illustration purposes. Single-slot, bi-directional message exchange may be implemented by similar processes with fewer or additional operations, for example, further optimization operations may be added. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 8:
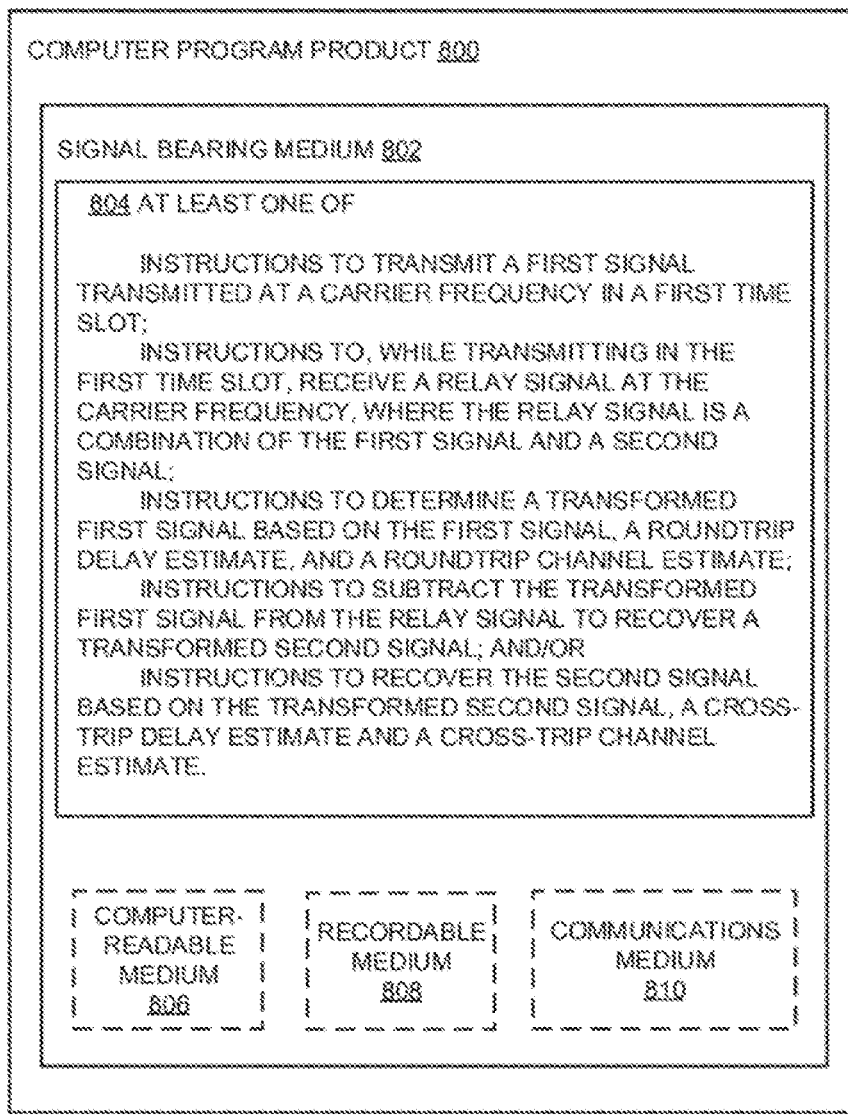
FIG. 8 illustrates an example computer program product to implement single-slot bi-directional message exchange in relay networks as described herein.

FIG. 8 illustrates a block diagram of an example computer program product to implement single-slot bi-directional message exchange in relay networks as described herein, arranged in accordance with at least some embodiments described herein.

In some examples, as shown in FIG. 8, computer program product 800 may include a signal bearing medium 802 that may also include machine readable instructions 804 that, in response to execution by, for example, a processor, may provide the functionality or operations described above with respect to FIG. 1 through FIG. 5. Thus, for example, referring to processor 604, one or more of the tasks shown in FIG. 8 may be undertaken in response to the machine readable instructions 804 conveyed to the processor 604 by the signal bearing medium 802 to perform actions associated with performing single-slot, bi-directional message exchange in communication networks as described herein. Some of those instructions may include instructions to transmit a first signal at a carrier frequency in a first time slot; while transmitting in the first time slot, receive or otherwise detect/identify a relay signal at the carrier frequency, where the relay signal is a combination of the first signal and a second signal; determine a transformed first signal based on the first signal, a roundtrip delay estimate, and a roundtrip channel estimate; subtract the transformed first signal from the relay signal to recover a transformed second signal; and/or recover the second signal based on the transformed second signal, a cross-trip delay estimate and a cross-trip channel estimate.

In some implementations, signal bearing medium 802 depicted in FIG. 8 may encompass a computer-readable medium 806, such as, but not limited to, a hard disk drive (HDD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, computer program product 800 may be conveyed to the processor by an RF signal bearing medium 802, where the signal bearing medium 802 is conveyed by the communications medium 810 (e.g., a wireless communications medium conforming with the IEEE 802.11 standard).

According to some examples, methods to provide single-slot bi-directional message exchange between a first transceiver and a second transceiver are described. An example method may include transmitting, by the first transceiver, a first signal in a first time slot, wherein first signal is transmitted at a carrier frequency; receiving, by the first transceiver while transmitting in the first time slot, a relay signal, where the relay signal is received at the carrier frequency and where the relay signal is a combination of the first signal and a second signal; and determining, by the first transceiver, a transformed first signal based on the first signal, a roundtrip delay estimate, and a roundtrip channel estimate. The example method may also include subtracting, by the first transceiver, the transformed first signal from the relay signal to recover a transformed second signal; and recovering, by the first transceiver, the second signal based on the transformed second signal, a cross-trip delay estimate and a cross-trip channel estimate.

According to other examples, transmitting the first signal and receiving the relay signal may include transmitting of the first signal through a transmit port of a full-duplex, single channel (FDSC) module, and receiving the second signal through a receive port of the FDSC module. Receiving the relay signal may include receiving the relay signal from a relay transceiver, and the second signal may be transmitted from the second transceiver to the relay transceiver. The method may further include transmitting, by the first transceiver, a first pilot signal during a non-interference slot.

According to further examples, transmitting the first pilot signal during the non-interference slot may include transmitting in a time period during which the second transceiver is in a quiet state. Determining the transformed first signal based on the first signal, the roundtrip delay estimate, and the roundtrip channel estimate may include determining the roundtrip delay estimate and the roundtrip channel estimate based on the first pilot signal, and computing the transformed first signal as a product of the roundtrip channel estimate and the first signal delayed by the roundtrip delay estimate. The method may also include receiving, by the first transceiver, a second pilot signal from the second transceiver during a time period during which the first transceiver is in a quiet state. The method may further include determining the cross-trip delay estimate and the cross-trip channel estimate based on the second pilot signal.

According to other examples, a transceiver device for single slot signal exchange may be described. An example transceiver device may include a full-duplex single carrier (FDSC) module configured to transmit a first signal and to receive a relay signal in a first time slot, the first signal and the relay signal being transported on a common carrier frequency across an intervening communication channel, where the relay signal is a combination of the first signal and a second signal; a timing adjustment module coupled to the FDSC module, the timing adjustment module configured to determine a roundtrip delay estimate and a cross-trip delay estimate; and a channel estimator module coupled to the FDSC module, the channel estimator module configured to determine a roundtrip channel estimate and a cross-trip channel estimate. The example transceiver device may further include a signal recovery module coupled to the FDSC module, the signal recovery module configured to recover the second signal based on the first signal, the relay signal, the roundtrip delay estimate, the roundtrip channel estimate, the cross-trip delay estimate and the cross-trip channel estimate.

According to some examples, the FDSC module may be configured to receive the relay signal from a relay transceiver and the second signal may be transmitted from a second transceiver that exchanges messages with the transceiver device. The transceiver device may be further configured to transmit a first pilot signal during a non-interference slot. The timing adjustment module may be configured to determine the roundtrip delay estimate based on the first pilot signal. The channel estimator module may be configured to determine the roundtrip channel estimate based on the first pilot signal. The transceiver device may be further configured to receive a second pilot signal during a time period during which the transceiver device is in a quiet state.

According to other examples, the timing adjustment module may be configured to determine the cross-trip delay estimate based on the second pilot signal. The channel estimator module may also be configured to determine the cross-trip channel estimate based on the second pilot signal. The transceiver device may be further configured to transition to the quiet state before each message transmission slot. The transceiver device may be further configured to transition to the quiet state after a specific number of message transmission slots, where the specific number of message transmission slots is determined based on a variation characteristics of the communication channel. The relay transceiver may be an amplify-and-forward (AF) relay, an estimate-and-forward (EF) relay, or a demodulate-and-forward (DF) relay.

According to further examples, a method for message exchange in a single time slot in a relay network may be described. An example method may include transmitting, by a first node of the relay network, a first signal; transmitting, by a second node of the relay network, a second signal; receiving, by a relay node of the relay network, the first signal and the second signal; transmitting, by the relay node, a relay signal, wherein the relay signal is based on the first signal and the second signal; and receiving, by the first node and the second node, the relay signal. The example method may further include subtracting, by the first node, a transformed first signal from the relay signal to recover the second signal; and subtracting, by the second node, a transformed second signal from the relay signal to recover the first signal, where the first node, the second node and the relay node concurrently transmit and receive in the single time slot, and where the first signal, the second signal and the relay signal are transmitted at a carrier frequency.

According to other examples, the method may also include setting the first node to a quiet state; transmitting, by the second node of the relay network, a pilot signal; and determining, by the second node, a round-trip delay and a round-trip channel state based on the pilot signal. The transformed first signal may be computed based upon the first signal, the round-trip delay and the round-trip channel estimate. Transmitting, by the relay node, the relay signal may include transmitting the relay signal based on one of an amplification-and-forward operation, an estimation-and-forward operation, or a demodulation-and-forward operation on the first signal and the second signal.

According to yet other examples, a communication system configured to support single-slot bi-directional message exchange may be described. An example communication system may include a first node and a second node communicatively coupled to the first node via a relay node, where the first node and the second node may be configured to transmit respective messages simultaneously in a first time slot and decode the other node's transmitted message based on the each node's ability to distinguish its own transmitted message. The communication system may also include the relay node configured to forward the transmitted messages within the first time slot such that the first node receives a superimposition of its own transmitted message and the second node's transmitted message, and the second node receives a superimposition of its own transmitted message and the first node's transmitted message.

According to some examples, the first node, the second node, and the relay node may be configured to communicate by use of full-duplex, single channel (FDSC) communication. The first node and the second node may be further configured to employ a pilot signal generated by each node during a non-interference slot to estimate a channel state and/or a round-trip propagation delay of a communication channel associated with the exchanged messages. The first node or the second node may be configured to transition into a quiet state during the non-interference slot while the other of the first node or the second node is configured to transmit the pilot signal. One of the first node and the second node may be configured to transition into the quiet state before each message transmission slot.

According to other examples, one of the first node and the second node may be configured to transition into the quiet state after a specific number of message transmission slots, where the specific number of the message transmission slots is determined based on a variation of communication channel characteristics. The relay node may be an amplify-and-forward (AF) relay, an estimate-and-forward (EF) relay, or a demodulate-and-forward (DF) relay. The communication network may include an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

According to yet further examples, a wireless communication device configured to facilitate single-slot bi-directional message exchange may be described. An example wireless communication device may include a processor and a communication module configured to exchange messages with another wireless communication device via a relay node that employs full-duplex, single channel (FDSC) communication. The processor may be configured to perform or control performance of transmit, by the communication module, a first message in a first time slot, where a second message is transmitted from the other wireless communication device in the first time slot; receive, by the communication module, a superimposition of the first message and the second message; and decode the second message, at the first time slot, based on an ability to separate the first message from the received superimposition of the first message and the second message.

According to some examples, the communication module may be further configured to receive a pilot signal during a non-interference slot during which the wireless communication device is in a quiet state. The processor may also be configured to perform or control performance of estimate one or more channel characteristics of a communication channel associated with the exchanged messages based on the received pilot signal.

According to some examples, a non-transitory computer-readable medium may be described that includes computer-readable instructions stored thereon that are executable by one or more processors to perform or cause to be performed the methods described herein.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to provide single-slot bi-directional message exchange between a first transceiver and a second transceiver, the method comprising:
    transmitting, by the first transceiver, a first signal in a first time slot at a carrier frequency;
    receiving, by the first transceiver while transmitting in the first time slot, a relay signal at the carrier frequency, wherein the relay signal is a combination of the first signal and a second signal;
    determining, by the first transceiver, a transformed first signal based on the first signal, a roundtrip delay estimate, and a roundtrip channel estimate;
    subtracting, by the first transceiver, the transformed first signal from the relay signal to recover a transformed second signal; and
    recovering, by the first transceiver, the second signal based on the transformed second signal, a cross-trip delay estimate and a cross-trip channel estimate.

2. The method of claim 1, wherein receiving the relay signal comprises receiving the relay signal from a relay transceiver, and wherein the second signal is transmitted from the second transceiver to the relay transceiver.

3. The method of claim 2, further comprising:
    transmitting, by the first transceiver, a first pilot signal during a non-interference slot in a time period during which the second transceiver is in a quiet state.

4. The method of claim 3, wherein determining the transformed first signal based on the first signal, the roundtrip delay estimate, and the roundtrip channel estimate comprises:
    determining the roundtrip delay estimate and the roundtrip channel estimate based on the first pilot signal; and
    computing the transformed first signal as a product of the roundtrip channel estimate and the first signal delayed by the roundtrip delay estimate.

5. The method of claim 3, further comprising:
    receiving, by the first transceiver, a second pilot signal from the second transceiver during a time period during which the first transceiver is in the quiet state; and
    determining the cross-trip delay estimate and the cross-trip channel estimate based on the second pilot signal.

6. A transceiver device for single slot signal exchange, the transceiver device comprising:
    a full-duplex single carrier (FDSC) module configured to:
        transmit a first signal; and
        receive a relay signal in a first time slot, the first signal and the relay signal being transported on a common carrier frequency across an intervening communication channel, wherein the relay signal is a combination of the first signal and a second signal;
    a timing adjustment module coupled to the FDSC module, the timing adjustment module configured to determine a roundtrip delay estimate and a cross-trip delay estimate;
    a channel estimator module coupled to the FDSC module, the channel estimator module configured to determine a roundtrip channel estimate and a cross-trip channel estimate; and
    a signal recovery module coupled to the FDSC module, the signal recovery module configured to recover the second signal based on the first signal, the relay signal, the roundtrip delay estimate, the roundtrip channel estimate, the cross-trip delay estimate and the cross-trip channel estimate.

7. The transceiver device of claim 6, wherein the FDSC module is configured to:
    receive the relay signal from a relay transceiver; and
    transmit the second signal from a second transceiver that exchanges messages with the transceiver device.

8. The transceiver device of claim 6, wherein the transceiver device is further configured to:
    transmit a first pilot signal during a non-interference slot.

9. The transceiver device of claim 8, wherein the timing adjustment module is configured to:
determine the roundtrip delay estimate based on the first pilot signal.

10. The transceiver device of claim 8, wherein the channel estimator module is configured to:
determine the roundtrip channel estimate based on the first pilot signal.

11. The transceiver device of claim 8, wherein the transceiver device is further configured to:
receive a second pilot signal during a time period during which the transceiver device is in a quiet state, wherein the timing adjustment module is configured to determine the cross-trip delay estimate based on the second pilot signal.

12. The transceiver device of claim 11, wherein the channel estimator module is configured to:
determine the cross-trip channel estimate based on the second pilot signal.

13. The transceiver device of claim 6, wherein the transceiver device is further configured to:
transition to a quiet state before each message transmission slot.

14. The transceiver device of claim 6, wherein the transceiver device is further configured to:
transition to a quiet state after a specific number of message transmission slots, wherein the specific number of message transmission slots is determined based on a variation characteristics of the communication channel.

15. The transceiver device of claim 7, wherein the relay transceiver includes one of an amplify-and-forward (AF) relay, an estimate-and-forward (EF) relay, or a demodulate-and-forward (DF) relay.

16. A communication system configured to support single-slot bi-directional message exchange, the communication system comprising:
a first node;
a second node communicatively coupled to the first node via a relay node, wherein the first node and the second node are configured to:
transmit respective messages simultaneously in a first time slot; and
decode a first transmitted message of the first node based on an ability of the first node to determine the first transmitted message of the first node and an ability of the second node to determine a second transmitted message of the second node; and
the relay node configured to:
forward the first transmitted message of the first node and the second transmitted message of the second node within the first time slot such that the first node receives a superimposition of the first transmitted message of the first node and the second transmitted message of the second node and the second node receives another superimposition of the second transmitted message of the second node and the first transmitted message of the first node.

17. The communication system of claim 16, wherein the first node, the second node, and the relay node are configured to:
communicate by use of full-duplex single channel (FDSC) communication.

18. The communication system of claim 16, wherein the first node and the second node are further configured to:
employ a pilot signal generated by each node during a non-interference slot to perform one or more of: estimate a channel state and estimate a round-trip propagation delay of a communication channel associated with the exchanged messages; and
transition into a quiet state during the non-interference slot while the other of the first node and the second node is configured to transmit the pilot signal.

19. The communication system of claim 18, wherein the one of the first node and the second node is configured to:
transition into the quiet state before each message transmission slot.

20. The communication system of claim 18, wherein the one of the first node and the second node is configured to:
transition into the quiet state after a specific number of message transmission slots, wherein the specific number of the message transmission slots is determined based on a variation of communication channel characteristics.

21. A method for message exchange in a single time slot in a relay network, the method comprising:
transmitting, by a first node of the relay network, a first signal;
transmitting, by a second node of the relay network, a second signal;
receiving, by a relay node of the relay network, the first signal and the second signal;
transmitting, by the relay node, a relay signal, wherein the relay signal is based on the first signal and the second signal;
receiving, by the first node and the second node, the relay signal;
subtracting, by the first node, a transformed first signal from the relay signal to recover the second signal; and
subtracting, by the second node, a transformed second signal from the relay signal to recover the first signal,
wherein the first node, the second node and the relay node concurrently transmit and receive in the single time slot, and
wherein the first signal, the second signal and the relay signal are transmitted at a carrier frequency.

22. The method of claim 21, further comprising:
setting the first node to a quiet state;
transmitting, by the second node of the relay network, a pilot signal; and
determining, by the second node, a round-trip delay and a round-trip channel state based on the pilot signal.

23. A wireless communication device configured to facilitate single-slot bi-directional message exchange, the wireless communication device comprising:
a communication module configured to exchange messages with another wireless communication device via a relay node that employs full-duplex single channel (FDSC) communication;
a processor coupled to the communication module, the processor configured to perform or control performance of:
transmit, by the communication module, a first message in a first time slot, wherein a second message is transmitted from the other wireless communication device in the first time slot;
receive, by the communication module, a superimposition of the first message and the second message; and
decode the second message, at the first time slot, based on an ability to separate the first message from the received superimposition of the first message and the second message.

24. The wireless communication device of claim 23, wherein the communication module is further configured to:
   receive a pilot signal during a non-interference slot during which the wireless communication device is in a quiet state.

25. The wireless communication device of claim 24, wherein the processor is configured to perform or control performance of:
   estimate one or more channel characteristics of a communication channel associated with the exchanged messages based on the received pilot signal.

* * * * *